United States Patent
Fathollahi

(10) Patent No.: US 9,359,011 B2
(45) Date of Patent: Jun. 7, 2016

(54) ATTACHMENT ASSEMBLY

(71) Applicant: GM GLOBAL TECHNOLOGY OPERATIONS LLC, Detroit, MI (US)

(72) Inventor: Hojjat Fathollahi, Toronto (CA)

(73) Assignee: GM Global Technology Operations LLC, Detroit, MI (US)

(*) Notice: Subject to any disclaimer, the term of this patent is extended or adjusted under 35 U.S.C. 154(b) by 315 days.

(21) Appl. No.: 13/895,420

(22) Filed: May 16, 2013

(65) Prior Publication Data

US 2014/0338172 A1 Nov. 20, 2014

(51) Int. Cl.
| | |
|---|---|
| F16B 7/10 | (2006.01) |
| B62D 27/06 | (2006.01) |
| F16B 5/06 | (2006.01) |
| B60R 13/02 | (2006.01) |
| F16C 11/10 | (2006.01) |
| B62D 25/14 | (2006.01) |
| F16B 2/14 | (2006.01) |
| F16B 7/02 | (2006.01) |

(52) U.S. Cl.
CPC ............ *B62D 27/06* (2013.01); *B60R 13/0206* (2013.01); *F16B 5/0621* (2013.01); *B62D 25/14* (2013.01); *F16B 2/14* (2013.01); *F16B 7/025* (2013.01); *F16C 11/10* (2013.01); *Y10T 29/49826* (2015.01); *Y10T 403/32057* (2015.01); *Y10T 403/32254* (2015.01)

(58) Field of Classification Search
CPC .............. Y10T 403/32057; Y10T 403/32254; B60R 13/0206; B62D 25/14; B62D 27/06; F16B 2/14; F16B 7/025; F16B 13/063; F16C 11/10

USPC ....... 403/59, 83, DIG. 10; 296/29, 72, 193.02
See application file for complete search history.

(56) References Cited

U.S. PATENT DOCUMENTS

| | | | | | |
|---|---|---|---|---|---|
| 931,810 | A | * | 8/1909 | Tapling | 16/329 |
| 4,186,905 | A | * | 2/1980 | Brudy | 248/478 |
| 4,783,116 | A | * | 11/1988 | Hough | 296/216.07 |
| 4,797,983 | A | * | 1/1989 | Barnett et al. | 24/289 |
| 5,069,586 | A | * | 12/1991 | Casey | 411/339 |
| 5,143,500 | A | * | 9/1992 | Schuring et al. | 411/339 |
| 5,833,416 | A | * | 11/1998 | Cau | 411/55 |

(Continued)

FOREIGN PATENT DOCUMENTS

| | | | |
|---|---|---|---|
| CA | 2334365 | A1 * | 12/1999 |
| CN | 101925501 | A | 12/2010 |

*Primary Examiner* — Gregory Binda
*Assistant Examiner* — Nahid Amiri
(74) *Attorney, Agent, or Firm* — Quinn Law Group, PLLC

(57) ABSTRACT

An attachment assembly is configured to couple a panel assembly to a support member. The attachment assembly includes a first attachment member and a second attachment member movably coupled to the first attachment member. As such, the second attachment member is configured to move relative to the first attachment member. The second attachment member defines a cavity portion. The attachment assembly further includes a locking member movably coupled to the first attachment member between an unlocked position and a locked position. When the locking member is in the unlocked position, the second attachment member is movable with respect to the first attachment member. In the locked position, the locking member is at least partially disposed in the cavity portion, thereby fixing the position of the second attachment member with respect to the first attachment member.

16 Claims, 3 Drawing Sheets

(56) References Cited

U.S. PATENT DOCUMENTS

| | | | |
|---|---|---|---|
| 5,850,676 A * | 12/1998 | Takahashi et al. | 24/297 |
| 6,328,513 B1 * | 12/2001 | Niwa et al. | 411/339 |
| 7,065,963 B2 * | 6/2006 | Niwa | 60/323 |
| 7,862,275 B2 * | 1/2011 | Jatzke | 411/45 |
| 2006/0017306 A1 * | 1/2006 | Smith et al. | 296/146.7 |

* cited by examiner

ATTACHMENT ASSEMBLY

TECHNICAL FIELD

The present disclosure relates to an attachment assembly configured to couple a panel assembly to a support member such as a bar, bracket, brace, or any other suitable support structure.

BACKGROUND

Couplers and attachment assemblies are used to couple panels to one or more support members such as bars, brackets, and braces. For example, in motor vehicles, a plurality of panels and support members support and couple an instrument panel to a vehicle body. In particular, instrument panel support structures are often constructed from stamped and welded steel sheet metal assemblies and may include a plurality of supporting brackets or braces having a sufficient amount of surface area to allow the support structure to be attached to the vehicle and the instruments and other devices to be securely fastened within the panel.

SUMMARY

The present disclosure relates to attachment assemblies configured to couple a support member to a panel assembly. In an embodiment, the attachment assembly includes a first attachment member and a second attachment member movably coupled to the first attachment member. As such, the second attachment member is configured to move relative to the first attachment member. The second attachment member defines a cavity portion. The attachment assembly further includes a locking member movably coupled to the first attachment member between an unlocked position and a locked position. When the locking member is in the unlocked position, the second attachment member is movable with respect to the first attachment member. In the locked position, the locking member is at least partially disposed in the cavity portion so as to apply a force to the second attachment member to fix the position of the second attachment member with respect to the first attachment member.

In an embodiment, the second attachment member is configured to rotate relative to the first attachment member when the locking member is in the unlocked position. Alternatively or additionally, the second attachment member is configured to translate relative to the first attachment member when the locking member is in the unlocked position. The first attachment member may include a first attachment body defining a first attachment cavity. The first attachment cavity is configured to slidably receive a portion of the first attachment member. The first attachment member may include a first attachment flange coupled to the first attachment body. The first attachment flange is configured to be coupled to a panel assembly. The second attachment member may include a second attachment body configured to be slidably received in the first attachment cavity. The second attachment body may define the cavity portion. The cavity portion may have a substantially frusto-conical shape. The locking member may have a substantially frusto-conical shape. The first attachment member may include a first attachment flange coupled to the first attachment body, and the first attachment flange may define a threaded hole.

In an embodiment, the attachment assembly may further include a locking threaded screw coupled to the locking member. The locking threaded screw may be threadedly engaged with the threaded hole such that the locking member is configured to move with respect to the first attachment member upon rotation of the locking threaded screw about the longitudinal axis. The second attachment member may define at least one slit extending through the second attachment body. The slit is configured to allow the second attachment body to expand radially outward when the locking member is inserted into the cavity portion. The second attachment flange may be configured to be coupled to a support member so as to connect the panel assembly to the support member. The second attachment flange may define at least one second flange hole configured to receive a fastener so as to couple the support member to the second attachment flange. The attachment assembly may further include an attachment collar at least partially surrounding the first attachment member. The attachment collar may be coupled to the first attachment member and a panel assembly.

The present disclosure also relates to vehicles. In an embodiment, the vehicle includes a first panel assembly, a second panel assembly, and a support member configured to couple the first panel assembly to the second panel assembly. The vehicle includes an attachment assembly at least partially disposed within the first panel assembly. The attachment assembly is configured to couple the support member to the first panel assembly and includes a first attachment member coupled within the first panel assembly so that the first attachment member remains stationary with respect to the first panel assembly. Further, the attachment assembly includes a second attachment member movably coupled to the first attachment member. The second attachment member defines a cavity portion. The attachment assembly further includes a locking member movably coupled to the first attachment member between an unlocked position and a locked position. When the locking member is in the unlocked position, the second attachment member is movable with respect to the first attachment member. In the locked position, the locking member is at least partially disposed in the cavity portion so as to apply a force to the second attachment member to fix the position of the second attachment member with respect to the first attachment member. In an embodiment, the second attachment member may be configured to translate along a longitudinal axis with respect to the first attachment member. The second attachment member may be configured to rotate about the longitudinal axis with respect to the first attachment member. The cavity portion may have a substantially frusto-conical shape. The locking member may have a substantially frusto-conical shape.

The present disclosure also relates to methods of manufacturing a vehicle. In an embodiment, the method includes coupling an attachment assembly to a first panel assembly so that the attachment assembly is at least partly disposed within the first panel assembly. The attachment assembly includes a first attachment member, a second attachment member movably coupled to the first attachment member, and a locking mechanism configured to fix a position of the second attachment member with respect to the first attachment member. The method further includes coupling a support member to a second panel assembly. Further, the method includes moving the second attachment member toward the support member until a portion of the second attachment member abuts a portion of the support member. Moreover, the method includes coupling the support member to the second attachment member to couple the first panel assembly to the second panel assembly via the attachment assembly.

The above features and advantages, and other features and advantages, of the present invention are readily apparent from the following detailed description of some of the best modes and other embodiments for carrying out the invention, as

DETAILED DESCRIPTION

Figure 1:
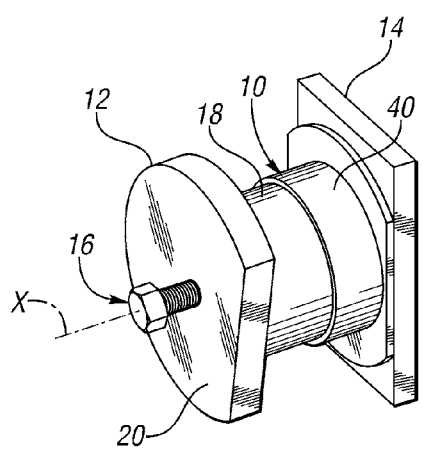
FIG. 1 is a perspective view of an attachment assembly in accordance with an embodiment of the present disclosure.

Referring to the drawings, wherein like reference numbers refer to like components, conventional vehicles typically include one or more panel assemblies coupled to each other via one or more support members. To couple the support member to at least one of the panel assemblies, conventional vehicles may include a coupler connecting the panel assembly to the support structure. The coupler is typically positioned between the support member and the panel assembly. However, the space within a car body of a conventional vehicle is limited. Accordingly, it is desirable to develop an attachment assembly that can be disposed at least partly within the panel assembly to maximize the use of space inside the car body of the vehicle. In addition, due to the spatial constraints inside a conventional vehicle, a conventional coupler may have to be repositioned in order to be coupled to the support member. Accordingly, it is desirable to develop an attachment assembly that can be adjusted (without being completely repositioned) so that it can be coupled between a conventional panel assembly and a conventional support member.

Figure 3:
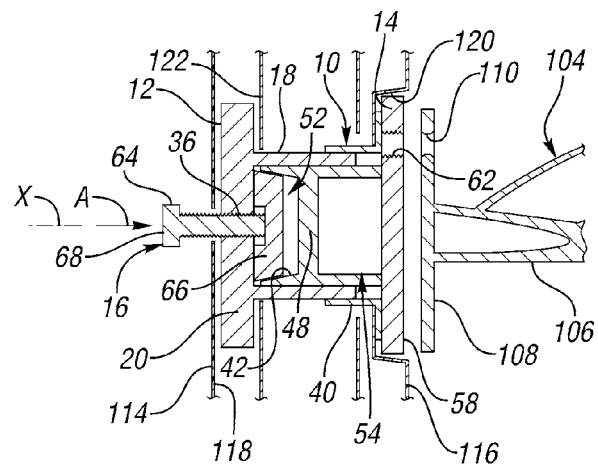
FIG. 3 is an enlarged side cross-sectional view of a portion of the vehicle shown in FIG. 2.
Figure 2:
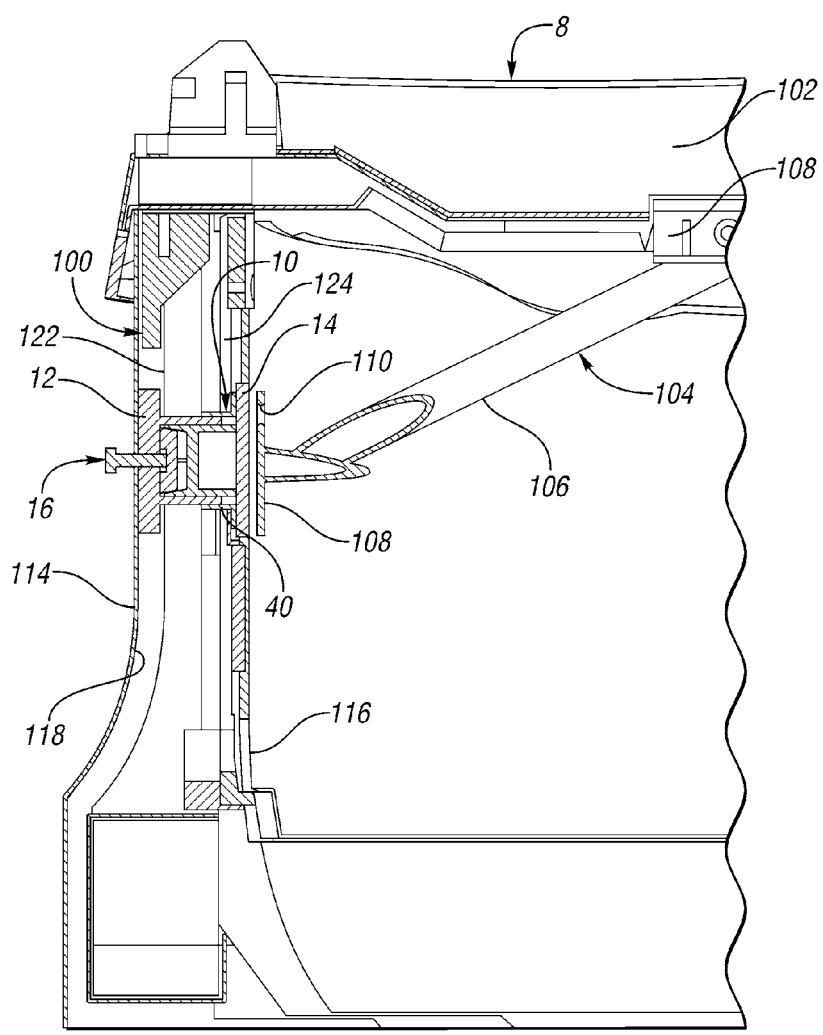
FIG. 2 is a side cross-sectional view of a portion of a vehicle including panel assemblies, a support member, and the attachment assembly of FIG. 1.

With reference to FIGS. 1-3, an attachment assembly 10 is configured to couple a first panel assembly 100 to a support member 104 and is configured, sized, and shaped to be at least partially disposed within the first panel assembly 100. In addition, portions of the attachment assembly 10 can be adjusted so that the attachment assembly 10 can be properly attached to the support member 104. The attachment assembly 10 may be wholly or partly made of a metallic material and may be part of a vehicle 8 such as a car or a truck. The first panel assembly 100 may also be referred as the panel assembly.

The vehicle 8 includes the first panel assembly 100, such as a hinge pillar assembly, a second panel assembly 102, such as an instrument panel, and a support member 104 configured to couple the first panel assembly 100 to the second panel assembly 102. The support member 104 may be wholly or partly made of a substantially rigid material, such as a metallic material, and may be configured as a bracket, a brace, a bar, or any other substantially rigid structure suitable to support the first panel assembly 100 and the second panel assembly 102. Irrespective of its configuration, the support member 104 can support the first panel assembly 100 and the second panel assembly 102. In the depicted embodiment, the support member 104 includes one or more support bars 106 and one or more support plates 108 connected to the support bars 106. Moreover, the support member 104 may define one or more support holes 110 extending through the support plates 108. Each support hole 110 is configured and sized to receive a support fastener 50 (FIG. 8) as discussed in detail below. With the aid of the support fastener 50 (FIG. 8), the support member 104 can couple the first panel assembly 100 to the second panel assembly 102. The support member 104 can be coupled to the first panel assembly 100 via the attachment assembly 10.

The first panel assembly 100 may be wholly or partly made of a polymeric material and includes a plurality of interconnected panels. For instance, the first panel assembly 100 may include an outer panel 114 and an inner panel 116. The outer panel 114 may be hollow and defines an outer panel cavity 118 configured, shaped, and sized to receive a portion of the attachment assembly 10. The inner panel 116 may be hollow and defines an inner panel recess 120 configured, shaped, and sized to receive a portion of the attachment assembly 10.

The first panel assembly 100 may further include a plurality of intermediate panels disposed between the outer panel 114 and the inner panel 116. For example, the first panel assembly 100 may include a first intermediate panel 122 and a second intermediate panel 124 connected to the first intermediate panel 122. The first intermediate panel 122 may be hollow and includes holes to accommodate at least part of the attachment assembly 10. The second intermediate panel 124 may also be hollow and include holes to accommodate at least part of the attachment assembly 10.

With continuing reference to FIGS. 1-3, the attachment assembly 10 includes a first attachment member 12 and a second attachment member 14 movably coupled to the first attachment member 12. As such, the second attachment member 14 is configured to translate and rotate with respect to the first attachment member 14 as discussed in detail below. In particular, the second attachment member 14 can translate along a longitudinal axis X relative to the first attachment member 12. For example, the second attachment member 14 can slide along first attachment member 12. Further, the second attachment member 14 can rotate about the longitudinal axis X relative to the first attachment member 12.

The attachment assembly 10 may further include an attachment collar 40 at least partially surrounding the first attachment member 12. The attachment collar 40 may be coupled to the inner panel 116 and the first attachment member 12 in order to fix the attachment assembly 10 to the first panel assembly 100. An adhesive may be used to couple the attachment collar 40 to the inner panel 116. Alternatively, any suitable fastener, such as rivets and screws, may be used to couple the attachment collar 40 to the inner panel 116. Regardless of how the attachment collar 40 is coupled to the inner panel 116, coupling the first attachment member 12 to the inner panel 116 (or any other part of the first panel assembly 100) via the attachment collar 40 allows the first attachment member 12 to be in a fixed position with respect to the first panel assembly 100. Therefore, the first attachment member 12 is configured to be coupled within the first panel assembly 100 so as to remain stationary with respect to the first panel assembly 100. However, the attachment collar 40 is not necessary, and the first attachment member 12 may be coupled directly to any part of the first panel assembly 100, such as the outer panel 114, via adhesives, fasteners (e.g., rivets or screws) or any other suitable apparatus or means. On the other hand, the second attachment member 14 should not be directly coupled to the first panel assembly 100 to allow the second attachment member 14 to move relative to the first attachment member 12.

The attachment assembly 10 additionally includes a locking mechanism 16 configured to fix the position of the second attachment member 14 with respect to the first attachment member 12. Specifically, the locking mechanism 16 is configured to move between an unlocked position and a locked position. When the locking mechanism 16 is in the unlocked position, the second attachment member 14 can translate and rotate with respect to the first attachment member 12. Conversely, when the locking mechanism 16 is in the locked position, the second attachment member 14 cannot move with respect to the first attachment member 12.

Figure 4:
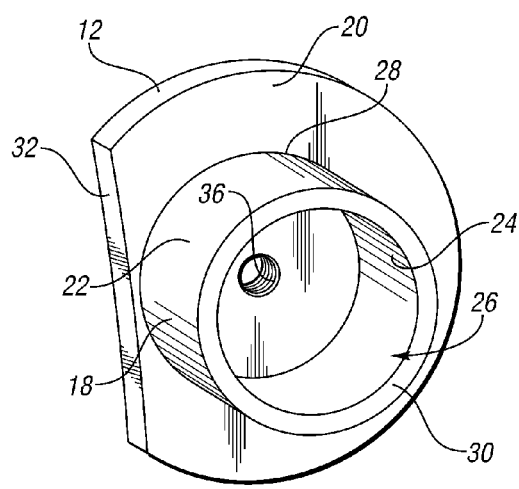
FIG. 4 is a perspective view of a first attachment member of the attachment assembly shown in FIG. 1.

With reference to FIG. 4, the first attachment member 12 may be wholly or partly made of a metallic material, such as aluminum, and includes a first attachment body 18 and a first attachment flange 20 coupled to the first attachment body 18. The first attachment body 18 may have a substantially cylindrical shape and includes a first outer body surface 22 and a first body inner surface 24 opposite the first body inner surface 24. The first body inner surface 24 defines a first attachment cavity 26, which may be substantially cylindrical. Accordingly, the first attachment body 18 defines the first attachment cavity 26. The first attachment cavity 26 may have a substantially constant transverse dimension, such as a diameter, along its length. The first attachment body 18 may be elongated along a longitudinal axis X (FIG. 1) and defines a first body leading edge 28 and a first body trailing edge 30 opposite to the first body leading edge 28.

The first attachment flange 20 may be coupled to the first body leading edge 28 and may have a substantially planar shape or any other suitable shape. For instance, in the depicted embodiment, although the first attachment flange 20 has a substantially disk shape, a portion of the first attachment flange 20 defines a substantially first flange flat surface 32 in order to accommodate the first attachment flange 20 within the outer panel cavity 118 (FIG. 3) defined within the outer panel 114 of the first panel assembly 100. It is nonetheless contemplated that the first attachment flange 20 may have other suitable shapes. The first attachment flange 20 may be coupled to the outer panel 114 by any suitable means such as adhesives, bolts, rivets, and welding.

In addition, the first attachment member 12 defines a first flange threaded hole 36 extending through the first attachment flange 20. The first flange threaded hole 36 may be coaxially disposed with respect to the first attachment body 18 along the longitudinal axis X (FIG. 3) and is configured to receive a fastener as described in detail below. It is contemplated that the first flange hole 36 may not be threaded.

Figure 5:
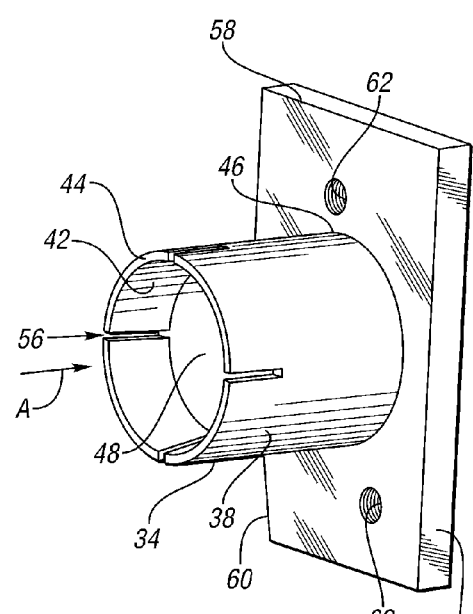
FIG. 5 is a perspective view of a second attachment member of the attachment assembly shown in FIG. 1.

With reference to FIG. 5, the second attachment member 14 includes a second attachment body 34 configured and sized to be slidably received in the first attachment cavity 26 (FIG. 4) defined by the first attachment member 12. As a consequence, the second attachment body 34 can translate and rotate with respect to the first attachment body 18 (FIG. 4). The second attachment body 34 may be wholly or partly made of a metallic material, such as aluminum, and defines a second outer body surface 38 that in turn defines an outer perimeter of the second attachment body 34. The outer perimeter of the second attachment body 34 may be substantially cylindrical. Alternatively, the second outer body surface 38 may define other suitable shapes.

The second attachment body 34 defines a second body leading edge 44 and a second body trailing edge 46 opposite to the second body leading edge 44. Moreover, the second attachment body 34 may include an intermediate wall 48 separating an interior cavity of the second attachment body 34 into a leading cavity portion 52 (FIG. 3) and a trailing cavity portion 54 (FIG. 3). Alternatively, the second attachment body 34 may only define one interior cavity (i.e., the leading cavity portion 52).

The second attachment body 34 includes a tapered inner surface 42, which defines the leading cavity portion 52. The tapered inner surface 42 has a substantially frusto-conical shape. Accordingly, the leading cavity portion 52 has a cavity transverse dimension D1 (FIG. 9), such as a diameter, that varies along the length of the second attachment body 34. Specifically, the cavity transverse dimension D1 of the leading cavity portion 52 decreases in a first direction from the second body leading edge 44 toward the second body trailing edge 46 as indicated by arrow A.

The second attachment member 14 further includes one or more second body openings 56 extending through a portion of the second attachment body 34. The second body openings 56 may be elongated and may be configured as slits. In the depicted embodiment, the second body openings 56 extend from the second body leading edge 44 toward the second body trailing edge 46 in the first direction as indicated by arrow A but do not extend pass the intermediate wall 48. Moreover, the second body openings 56 may be arranged annularly around the second attachment body 34. Irrespective of their spatial arrangement, the second body openings 56 allow at least a portion of the second attachment body 34 to expand radially in an outward direction in response to a force applied by a portion of the locking mechanism 16 as discussed in detail below.

The second attachment member 14 further includes a second attachment flange 58 coupled to the second attachment body 34. In particular, the second attachment flange 58 may be coupled to the second body trailing edge 46 by any suitable means such as adhesives, bolts, rivets, and welding. Further, the second attachment flange 58 may be substantially planar and is configured, shaped, and sized to be received in the recess 120 (FIG. 3) of the inner panel 116. For example, although the second attachment flange 58 may be substantially rectangular, the second attachment flange 58 may define a flange cut 60 that allows the second attachment flange 58 to be disposed in the recess 120.

Figure 8:
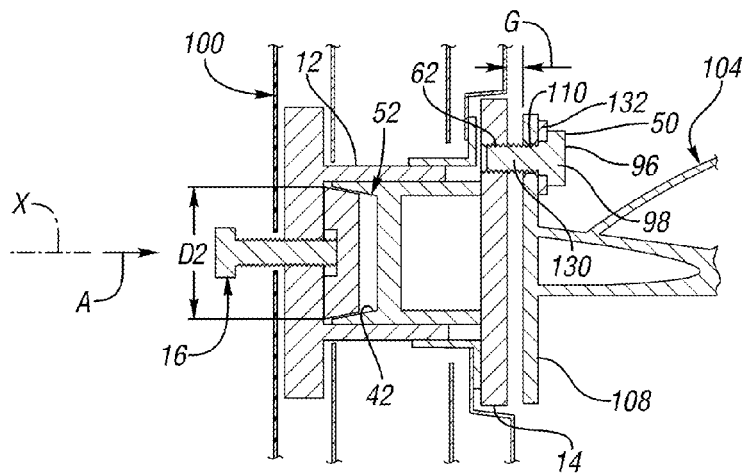
FIG. 8 is a side cross-sectional view of the attachment assembly, the support member, and one of the panel assemblies depicted in FIG. 2, showing the second attachment member in a first position and the locking member in an unlocked position.

In addition to the flange cut 60, the second attachment member 14 may define one or more second flange holes 62 extending through the second attachment flange 58. Each of the second flange holes 62 may be threaded and is configured to receive the support fastener 50 (FIG. 8). As such, the support fastener 50 (FIG. 8) may be introduced through the second flange hole 62 and support hole 110 in order to couple the support member 104 to the attachment assembly 10 as discussed in detail below.

With reference again to FIG. 3, the locking mechanism 16 is configured to fix the position of the second attachment member 14 with respect to the first attachment member 12. To this end, the locking mechanism 16 includes a locking driver 64 and a locking member 66 connected to the locking driver 64. The locking driver 64 may be configured as a locking threaded screw 68, which in turn is configured to be introduced through the first flange threaded hole 36. Thus, the locking threaded screw 68 is configured to threadedly engage the first flange threaded hole 36. A force can be applied to the locking driver 64 to move the locking member 66 axially along the longitudinal axis X between a locked position and an unlocked position. For example, turning or rotating the locking threaded screw 68 about the longitudinal axis X may also cause it to move axially along the longitudinal axis X. Given that the locking threaded screw 68 is connected to the locking member 66, the locking member 66 can move axially along the longitudinal axis X as the locking threaded screw 68 moves along the longitudinal axis X.

Figure 6:
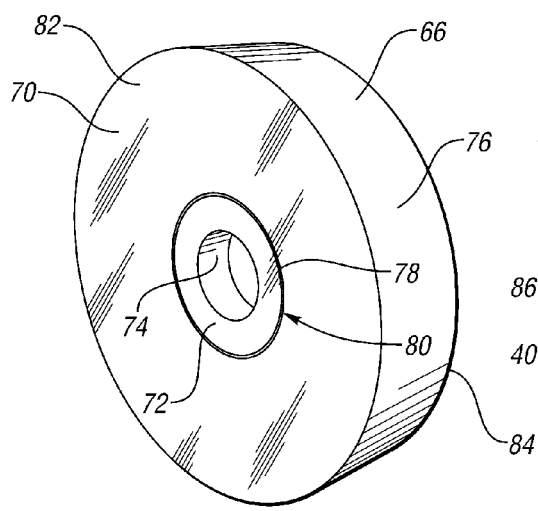
FIG. 6 is a perspective view of a locking member of the attachment assembly shown in FIG. 1.

With reference to FIG. 6, the locking member 66 includes an outer locking portion 70 and an inner locking portion 72 disposed within the outer locking portion 70. The outer locking portion 70 may have a substantially frusto-conical shape and may be wholly or partly made of a metallic material such as aluminum. Further, the outer locking portion 70 includes a leading locking surface 82 and a trailing locking surface 84 opposite the leading locking surface 82. In addition to the leading locking surface 82 and the trailing locking surface 84, the outer locking portion 70 has an outer locking surface 76 and an inner locking surface 78 opposite the outer locking surface 76. The outer locking surface 76 defines an outer locking member transverse dimension D2 (FIG. 8) of the locking member 66. The outer locking member transverse dimension D2 (FIG. 8) may be a diameter and varies along the length of the locking member 66. In particular, the outer locking member transverse dimension D2 of the locking member 66 decreases in the first direction, which is indicated by arrow A (FIG. 3), from the leading locking surface 82 toward the trailing locking surface 84.

The inner locking surface 78 defines a locking recess 80 extending in the first direction, which is indicated by arrow A (FIG. 3) from the leading locking surface 82 toward the trailing locking surface 84. The locking recess 80 does not necessarily extend to the leading locking surface 82 and may have a substantially cylindrical shape. Irrespective of its particular shape, the locking recess 80 is configured, shaped, and sized to tightly receive the inner locking portion 72. As such, the inner locking portion 72 is coupled to the outer locking portion 70 within the locking recess 80.

The inner locking portion 72 may be wholly or partly made of a polymeric material, such as rubber, and may have a substantially annular shape. The locking member 66 defines a locking member hole 74 extending through the inner locking portion 72. The locking member hole 74 is configured, shaped, and sized to tightly receive a portion of the locking driver 64 (FIG. 3) so as to couple the locking driver 64 to the locking member 66.

Figure 7:
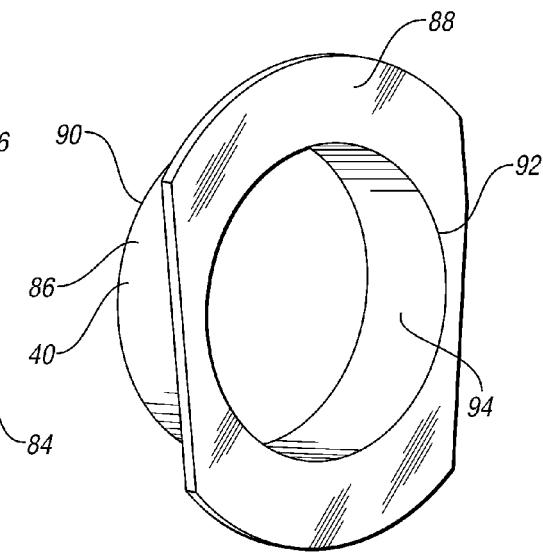
FIG. 7 is a perspective view of an attachment collar of the attachment assembly shown in FIG. 1.

With reference to FIG. 7, the attachment collar 40 includes a collar body 86 and a collar flange 88 coupled to the collar body 86 by any suitable means such as adhesives, bolts, screws, rivets, and welding. The collar body 86 may be coupled to the first attachment body 18 (FIG. 4) by any suitable means such as adhesives, bolts, screws, rivets, and welding. In the depicted embodiment, the collar body 86 may be substantially cylindrical and has a leading collar edge 90 and a trailing collar edge 92 opposite the leading collar edge 90. The collar flange 88 protrudes from the trailing collar edge 92 and is configured to be coupled to the inner panel 116 (or any other part of the first panel assembly 100) by any suitable means such as adhesives, bolts, rivets, and welding.

The attachment collar 40 further defines a collar cavity 94 extending through the collar body 86. The collar cavity 94 is configured, shaped, and sized to receive a portion of the first attachment member 12 (FIG. 3). In the depicted embodiment, the collar cavity 94 is configured, shaped, and sized to receive at least a portion of the first attachment body 18 (FIG. 4).

With reference to FIG. 8, as discussed above, the attachment assembly 10 can be used to couple the support member 104 to the first panel assembly 100. Before coupling the support member 104 to the first panel assembly 100, the attachment assembly 10 may be first positioned within the first panel assembly 100. To do so, the parts of the attachments assembly 10 may be coupled to the different panels 114, 116, 122, 124 while the first panel assembly 100 is being assembled. Once the attachment assembly 10 is disposed within the first panel assembly 100, it might be necessary to move a portion of the attachment assembly 10 closer to the support member 104 because there might be a gap G between the support member 104 and the attachment assembly 10. It might also be necessary to turn a portion of the second adjustment member 14 because one or more of the second flange holes 62 may not be aligned with one of the support holes 110. To align one of the second flange holes 62 with one of the support holes 110, the second attachment member 14 may be rotated or turned about the longitudinal axis X with respect to the first attachment member 12 until the second flange holes 62 are aligned with the support holes 110.

Figure 9:
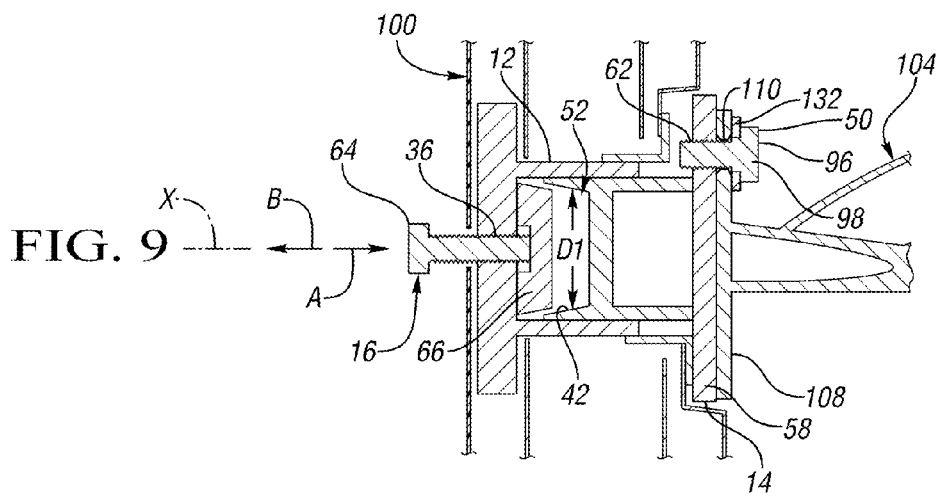
FIG. 9 is a side cross-sectional view of the attachment assembly, the support member, and one of the panel assemblies depicted in FIG. 2, showing the second attachment member in a second position and the locking member in an unlocked position.

To close the gap G, the second attachment member 14 may then be translated with respect to the first attachment member 12 between a first position (FIG. 8) and a second position (FIG. 9). To do so, the support fastener 50 may be used to move the second attachment member 14 toward the support member 104. The support fastener 50 may be configured as a support screw 96 and may include a support screw head 98 and a threaded screw shank 130. The support screw shank 130 may be introduced through one of the support holes 110 and a respective second flange hole 62. A washer 132 may be disposed between the support screw head 98 and the support plate 108.

Once the support screw shank 130 is threadedly engaging the second flange hole 62, the support fastener 50 may be turned to urge movement of the second attachment member 14 with respect to the first attachment member 12 in the first direction indicated by arrow A. In other words, turning the support fastener 50 causes the second attachment member 14 to move toward the support member 104 while the first attachment member 12 remains stationary. As the support fastener 50 is turned, the second attachment body 34 slides through the first attachment cavity 26 defined by the first attachment body 18. In other words, as the support fastener 50 is turned, the second attachment body 34 slides within the first attachment body 18 along the longitudinal axis X. The support fastener 50 may be turned until the second attachment member 14 reaches the second position (FIG. 9) in which the second attachment flange 58 abuts the support plate 108. At this point, the second attachment member 14 is affixed to the support member 104 but the second attachment member 14 can still move with respect to the first attachment member 12 if the support member 104 is moved.

Figure 10:
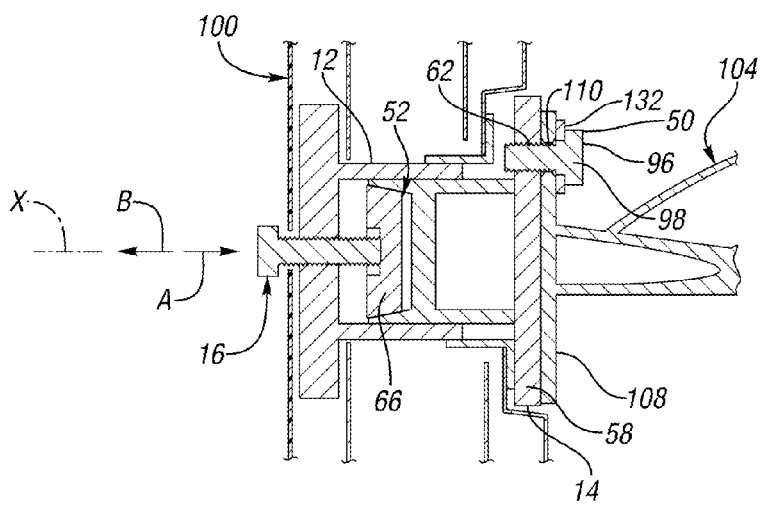
FIG. 10 is a side cross-sectional view of the attachment assembly, the support member, and one of the panel assemblies depicted in FIG. 2, showing the second attachment member in the second position and the locking member in the locked position.

To fix the position of the second attachment member 14 with respect to the first attachment member 12, the locking mechanism 16 can be moved from the unlocked position (FIG. 9) to the locked position (FIG. 10). To do so, the locking driver 64, which is threadedly engaged to the first flange threaded hole 36, can be turned or rotated about the longitudinal axis X. Turning or rotating the locking driver 64 about the longitudinal axis X in a first rotational direction causes the locking driver 64 to move along the longitudinal axis X in the first direction indicated by arrow A. Because the locking member 66 is coupled to the locking driver 64, the locking member 66 also moves in the first direction indicated by arrow A as the locking driver 64 moves in the same direction. The locking member 66 may therefore move between the unlocked position (FIG. 9) and the locked position (FIG. 10) upon rotation of the locking driver 64. While moving in the first direction indicated by arrow A, the locking member 66 gradually applies a force to the tapered inner surface 42. In response, part of the second attachment body 34 may expand radially outward due to the second body openings 56 (FIG. 5). Nevertheless, the second attachment body 34 also applies a force to the first attachment body 18 of the first attachment member 12 when the locking member 66 is moved to the locked position. The force applied by the second attachment body 34 to the first attachment body 18 increases as the locking member 66 moves farther into the leading cavity portion 52. Eventually, the force applied by the second attachment body 34 to the first attachment body 18 is large enough to fix the position of the second attachment member 14 with respect to the first attachment member 12 as seen in FIG. 10. Hence, when locking member 66 is in the locked position (FIG. 10), the second attachment member 14 is fixed to the first attachment member 12, and the locking mechanism 16 prevents, or at least inhibits, the second attachment member 14 from moving with respect to the first attachment member 12. If for some reason, it is necessary to unlock the locking mechanism 16. The locking driver 64 can be turned in a second rotational direction (which is opposite to the first rotational direction) to move the locking member 66 along the longitudinal axis X in a second direction (opposite to the first direction) as indicated by arrow B.

The attachment assembly 10 can be used in the process of manufacturing a vehicle 8. For instance, a method of manufacturing the vehicle 8 may include coupling the attachment assembly 10 to the first panel assembly 100 so that the attachment assembly 10 is at least partly disposed within the first panel assembly 100. Moreover, the method includes coupling the support member 104 to the second panel assembly 102. The method may further include moving the second attachment member 14 toward the support member 104 until a portion of the second attachment member 14 abuts a portion of the support member 104. Further, the method includes coupling the support member 104 to the second attachment member 14 to couple the first panel assembly 100 to the second panel assembly 102 via the attachment assembly 10. The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An attachment assembly, comprising:
a first attachment member defines a first attachment cavity;
a second attachment member movably coupled to the first attachment member, wherein the second attachment member is configured to move relative to the first attachment member, the second attachment member defines a cavity portion, the second attachment member includes a second attachment body configured to be slidably received in the first attachment cavity, and the second attachment member defines at least one slit extending through the second attachment body;
a locking member movably coupled to the first attachment member between an unlocked position and a locked position, wherein the locking member has a substantially frusto-conical shape;
wherein, when the locking member is in the unlocked position, the second attachment member is movable relative to the first attachment member;
wherein, in the locked position, the locking member is at least partially disposed in the cavity portion to fix a position of the second attachment member with respect to the first attachment member; and
wherein the slit is configured to allow the second attachment body to expand radially outward when the locking member is inserted into the cavity portion.

2. The attachment assembly of claim 1, wherein the second attachment member is configured to rotate relative to the first attachment member when the locking member is in the unlocked position.

3. The attachment assembly of claim 1, wherein the first attachment member includes a first attachment body defining the first attachment cavity, and the first attachment cavity is configured to slidably receive a portion of the second attachment member.

4. The attachment assembly of claim 3, wherein the first attachment member includes a first attachment flange coupled to the first attachment body, and the first attachment flange is configured to be coupled to a panel assembly.

5. The attachment assembly of claim 4, wherein the first attachment member includes a first attachment flange coupled to the first attachment body, and the first attachment flange defines a threaded hole.

6. The attachment assembly of claim 5, further comprising a locking threaded screw coupled to the locking member, wherein the locking threaded screw is threadedly engaged with the threaded hole such that the locking member is configured to move with respect to the first attachment member upon rotation of the locking threaded screw relative to the first attachment flange.

7. The attachment assembly of claim 4, wherein the second attachment member includes a second attachment flange configured to be coupled to a support member so as to connect the panel assembly to the support member.

8. The attachment assembly of claim 7, wherein the second attachment flange defines at least one second flange hole configured to receive a fastener so as to couple the support member to the second attachment flange.

9. The attachment assembly of claim 1, wherein the second attachment body defines the cavity portion.

10. The attachment assembly of claim 9, wherein the cavity portion has a substantially frusto-conical shape.

11. The attachment assembly of claim 1, wherein the second attachment member is configured to rotate relative to the first attachment member when the locking member is in the unlocked position.

12. A vehicle, comprising:
a first panel assembly;
a second panel assembly;
a support member configured to couple the first panel assembly to the second panel assembly; and
an attachment assembly at least partially disposed within the first panel assembly, the attachment assembly being configured to couple the support member to the first panel assembly, the attachment assembly including:
a first attachment member coupled within the first panel assembly so that the first attachment member remains stationary with respect to the first panel assembly, wherein the first attachment member defines a first attachment cavity;

a second attachment member movably coupled to the first attachment member, wherein the second attachment member defines a cavity portion, the second attachment member includes a second attachment body configured to be slidably received in the first attachment cavity, and the second attachment member defines at least one slit extending through the second attachment body;

a locking member movably coupled to the first attachment member between an unlocked position and a locked position;

wherein, when the locking member is in the unlocked position, the second attachment member is movable with respect to the first attachment member;

wherein, in the locked position, the locking member is at least partially disposed in the cavity portion to fix a position of the second attachment member with respect to the first attachment member; and wherein the slit is configured to allow the second attachment body to expand radially outward when the locking member is inserted into the cavity portion.

13. The vehicle of claim 12, wherein the second attachment member is configured to translate along a longitudinal axis with respect to the first attachment member.

14. The vehicle of claim 13, wherein the second attachment member is configured to rotate about the longitudinal axis with respect to the first attachment member.

15. The vehicle of claim 12, wherein the cavity portion has a substantially frusto-conical shape.

16. The vehicle of claim 15, wherein the locking member has a substantially frusto-conical shape.

* * * * *